US008269168B1

(12) United States Patent
Axelrod et al.

(10) Patent No.: US 8,269,168 B1
(45) Date of Patent: Sep. 18, 2012

(54) META MATERIALS INTEGRATION, DETECTION AND SPECTRAL ANALYSIS

(75) Inventors: Noel Axelrod, Jerusalem (IL); Amir Lichtenstein, Tel Aviv (IL); Eran Ofek, Modi'in (IL)

(73) Assignee: Physical Logic AG, Zug (CH)

( * ) Notice: Subject to any disclaimer, the term of this patent is extended or adjusted under 35 U.S.C. 154(b) by 1168 days.

(21) Appl. No.: 12/112,779

(22) Filed: Apr. 30, 2008 (Under 37 CFR 1.47)

Related U.S. Application Data

(60) Provisional application No. 60/914,787, filed on Apr. 30, 2007, provisional application No. 60/914,798, filed on Apr. 30, 2007.

(51) Int. Cl.
*G01J 5/02* (2006.01)

(52) U.S. Cl. ................................. 250/338.1; 250/336.1

(58) Field of Classification Search ............... 250/338.1, 250/336.1

See application file for complete search history.

(56) References Cited

U.S. PATENT DOCUMENTS

| | | | | |
|---|---|---|---|---|
| 7,365,701 | B2 * | 4/2008 | Werner et al. | 343/909 |
| 7,420,524 | B2 * | 9/2008 | Werner et al. | 343/909 |
| 2004/0066251 | A1 * | 4/2004 | Eleftheriades et al. | 333/117 |
| 2006/0125681 | A1 * | 6/2006 | Smith et al. | 342/120 |

OTHER PUBLICATIONS

McVay et al., High Impedance Metamaterial Surfaces Using Hilbert Curve Inclusions, Mar. 2004, IEEE Microwave and Wireless Component Letters, vol. 14, pp. 130-132.*

* cited by examiner

*Primary Examiner* — Christine Sung
(74) *Attorney, Agent, or Firm* — Mark M Friedman

(57) ABSTRACT

A detector and modulator of electromagnetic radiation is 3-dimensional structure made of substantially 2 dimensional high impedance metamaterial surfaces stacked one above the other with a dielectric layer in between and located above a conducting ground plane. Each 2 dimension surface may be formed by an open continuous conductive trace, such as metallic wire or a printed circuit line, which is cast or plated on or into a 2-D periodic arrangement of an element that belongs to the Hilbert space filling curves.

4 Claims, 5 Drawing Sheets

| |
|---|
| Layer 1 |
| Dielectric |
| Layer 2 |
| Dielectric |
| Layer 3 |
| Dielectric |
| Conducting Ground Plane |

FIG. 7A
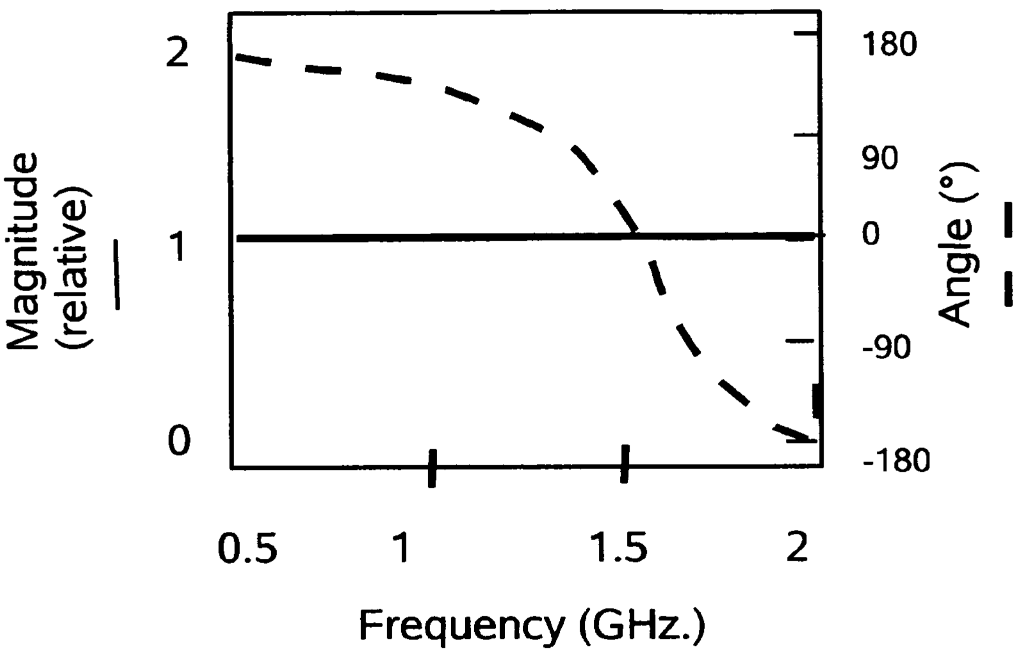
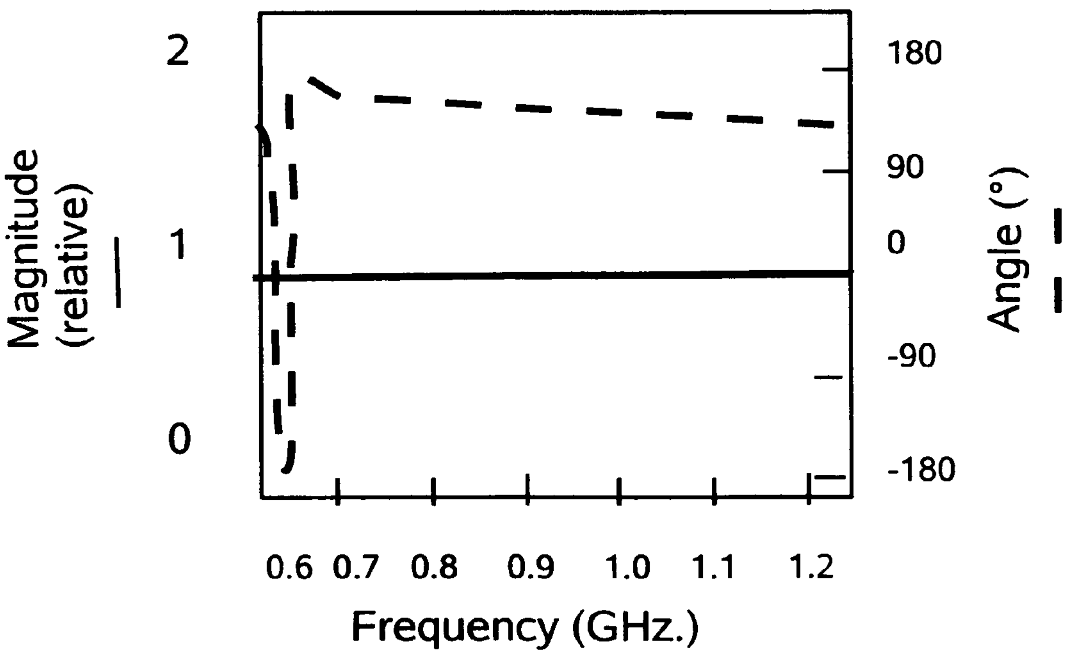
FIG. 7B

META MATERIALS INTEGRATION, DETECTION AND SPECTRAL ANALYSIS

CROSS REFERENCE TO RELATED APPLICATIONS

The present application claims priority to the US provisional patent applications having application Ser. Nos. 60/914,787 (for "Meta Materials Based Phase Discrimination Analysis") and 60/914,798 (for "Pulse Compression and Expansion In Meta Materials"), both of which were filed on Apr. 30, 2007, and are now both incorporated herein by reference.

BACKGROUND OF INVENTION

This invention relates generally to the fields of metamaterials, spectral analysis and electromagnetic radiation detection, and more specifically to the use of metamaterials for the detection and spectral analysis of electromagnetic radiation.

Another aspect of the invention relates generally to the fields of metamaterials and wave analysis, and more specifically to phase discrimination analysis on a monochromatic waveform utilizing metamaterials.

Still a further aspect of the invention relates generally to the fields of metamaterials and wave analysis, and more specifically to expanding or compressing electromagnetic radiation pulses using metamaterials.

An integral part of systems in the area of both material detection and "see through walls" systems, as well as other systems used for detection, are the detector elements. In different embodiments of these systems, the detector elements can have differing requirements. Some of the requirements can include the following.

- Operating in the gigahertz to terahertz (GHz-THz) frequency ranges.
- Performing processing on the detected information in the GHz-THz frequency ranges (In current systems it is extremely difficult to perform processing in the GHz-THz frequency ranges due to computational power limitations. Current methods for auto-correlation analysis were shown to be efficient at frequencies of up to 20-30 GHz.)
- Having a small enough size to be portable. This can allow a system that includes the detector elements to be installed in the field with relative ease.
- Sensitivity is another important aspect of the detector requirements. The detector elements may have requirements to be sensitive enough to detect even low-energy signals which are of interest to the overall system.

Accordingly, at least some of the objections of the present invention are to overcome the deficiencies and limitations in the prior art noted above.

SUMMARY OF INVENTION

In one embodiment of the invention a detector for electromagnetic radiation, comprises a plurality of metamaterials layers for receiving electromagnetic radiation of a predetermined frequency, a dielectric layer separating each metamaterial layer, a ground plane separated from at least one of the metamaterial layers by another dielectric layer, wherein the metamaterial is a continuous conductive 2-D Hilbert space filling curve having at least two terminals.

In another embodiment a circuit for detecting electromagnetic radiation comprises; a detector comprising a continuous conductive 2-D Hilbert space filling curve having at least a first and second for receiving electromagnetic radiation of a predetermined first frequency, as well as a ground plane separated from the detector plane layers by a dielectric layer, the ground plane being connected to at least one terminal of said detector, a dielectric layer separating each meta-material layer, a mixer having at least two input terminals and an output terminal, at least one input terminal connected to with another terminal of the detector not connected to said ground plane of said detector, said mixer being further in signal communication with a local oscillator having an output connected to the other input of said mixer, a low pass filter connected at an input terminal to the output terminal of said mixer, wherein said local oscillator operative to be tuned to a frequency (f o) which is close to the first frequency of the detector, whereby the output from the circuit includes the power spectrum of the signal and phase information about the electromagnetic radiation received at said detector, and preferably includes an amplifier connected to receive and amplify the output of said low pass filter.

In a still further embodiment of the invention there is provided a method of pulse width modulation of electromagnetic radiation comprising providing a composition of matter comprising; plurality of metamaterials layers, each layer for receiving electromagnetic radiation of a predetermined frequency, a dielectric layer separating each meta-material layer, wherein the metamaterial is a continuous conductive 2-D Hilbert space filling curve having at least two terminals, and then exposing the composition of matter to an electromagnetic signal to be modulated followed by acquiring the electromagnetic radiation signal after at least one of transmission, absorption or reflection by the composition of matter.

The above and other objects, effects, features, and advantages of the present invention will become more apparent from the following description of the embodiments thereof taken in conjunction with the accompanying drawings.

BRIEF DESCRIPTION OF THE DRAWINGS

Aspects of the present invention are more particularly described below with reference to the following figures, which illustrate exemplary embodiments of the present invention.

FIG. 3A is an exploded perspective view of an embodiment of a detector using three Peano layers or slices of increasing iteration order; while FIG. 3B is a cross-sectional elevation of the detector

FIGS. 7A and 7B illustrate the magnitude and phase of the reflection coefficient from a Peano surface above a conducting ground plane.

DETAILED DESCRIPTION

Figure 1:
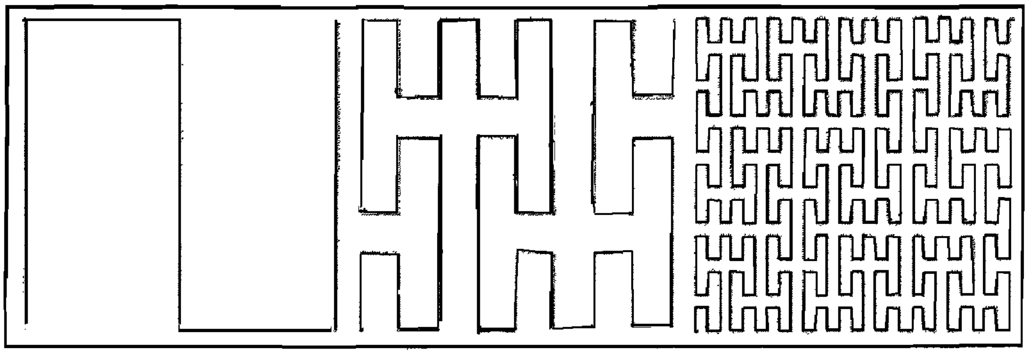
FIG. 1 illustrates an embodiment of Peano space filling curves at three different scales.

Referring to FIGS. 1 through 7, wherein like reference numerals refer to like components in the various views, there is illustrated therein a new and improved Meta Materials Integration, Detection and Spectral Analysis.

Metamaterials are basic materials with artificial molecular structure, designed to intentionally alter the basic material properties including the electromagnetic properties of the material. Some examples of metamaterials are terahertz (THz) and optical-magnetic structures, as well as lenses for microwave frequencies with a shorter focal length than conventional lenses but having the same radius of curvature.

The following publications are incorporated herein by reference: 1. Yen T. J. et al., "*Terahertz Magnetic Response from Artificial Materials,*" Science, 2004, vol. 303, pp. 1494-1496.; 2. Grigorenko A. N et al., "*Nanofabricated Media with Negative Permeability at Visible Frequencies*," Nature, 2005, vol. 438, pp. 335-338; 3. Parrazoli e. G., et al., "*Performance of a Negative Index of refraction Lens*," Applied Physics Letters, Am. lost. of Physics, 2004, vol. 84, no. 17, pp. 3232-3234.; 4. Notomi M., "*Theory of Light Propagation in Strongly Modulated Photonic Crystals*," Physical Rev. B, Am. Physical Soc., 2000, vol. 62, no. 16, pp. 10 696-10 705; 5. Eleftheriades G. V., et al., "*Planar Negative Refractive Index Media Using Periodically L-C Loaded Transmission Lines,*" IEEE Trans. Microwave Theory & Techniques, 2002, vol. 50, no. 12, pp. 2702-2712; 6. Alu A. and Engheta N., "*Optical Nanotransmission Lines,*" 1. Opt. Soc. Am. B, 2006, vol. 23, no. 3, pp. 571-583; 7. Zhu J, et al., "*Peano Antennas,*" IEEE Antennas & Wireless Propag. Letters, 2004, vol. 3, pp. 71-74. 8. P. Vodo et al. "*Microwave photonic crystal with tailor-made negative refractive index,*" Applied Physics Letters, Vol. 85, Number 10, 6 Sep. 2004; and. 9. Moussa, S. Foteinopoulou, C. M. Soukoulis, "*Delay-time investigation of electromagnetic waves through homogenous medium and photonic crystal left handed materials,*" Applied Physics Letters, Vol. 85, Number 7, 16 Aug. 2004.

Metamaterials are formed from repeating structural elements known to have strong response to electromagnetic fields. So long as the size and the spacing of the elements are much smaller than the electromagnetic radiation of interest, the incident radiation cannot distinguish between features and treats the material as a homogeneous composite. There are several approaches to obtain metamaterials, including photonic crystals, split ring resonators, transmission lines and their optical analogs.

Figure 2:
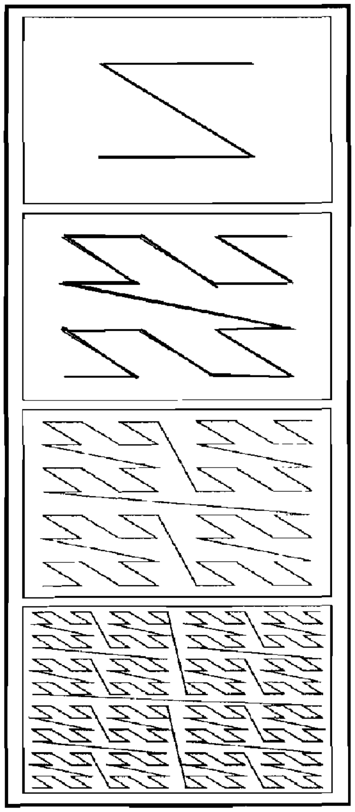
FIG. 2 is an illustration of another embodiment of space filling Z curves at four different scales.

Herein we describe a first embodiment of the invention as a 3-dimensional structure made of high impedance metamaterial surfaces stacked one above the other with a dielectric layer (such as air for example) in between and located above a conducting ground plane. Each surface is formed by an open continuous conductive trace, such as metallic wire or a printed circuit line, which is cast or plated on or into a 2-D periodic arrangement of an element that belongs to the Hilbert space filling curves. The repeating arrangement may be a Peano-Gosper curve (shown in FIG. 1), a Z-curve (shown in FIG. 2), or similar periodic arrangement. As the iteration order of the curve increases, the step order increases for the iterative filling of the 2-dimensional region. FIG. 1 shows the Peano-Gosper curve at three different iteration orders. FIG. 2 shows the Z-curve at four different iteration orders.

The curves pass through every point in the two dimensional space in which they are contained, without intersecting themselves. Physically this means that more "lines" can be compacted into the same surface area. From an electromagnetic point of view, these curves provide resonant structures of a very small footprint. Though small in its footprint, the structure can resonate at a wavelength much longer than its footprint. The following discussion will look at an embodiment using the Peano-Gosper curves, but similar periodic arrangements, including those discussed above, can be used.

When a Peano-Gosper high impedance surface made of thin metallic wire is placed in free space and is excited by normally incident electromagnetic radiation of varying frequencies, current is induced which reaches resonance on some frequencies. When the maximum value of the current is evaluated as a function of the excitation frequency, it is found that as the iteration order increases the resonance frequency decreases, meaning the electrical footprint of the surface changes according to its space filling arrangement.

Stacking surfaces of increasing order one beneath the other creates a structure that selects a very narrow bandwidth and resonates to it while being of a dimension smaller then the wavelength, thus overcoming the photonic crystals main disadvantage. An arrangement comprising multiple layers of Peano curves can be used.

The following section describes the structure, composition and operational principle of this metamaterial as a detector. According to Mc-Vay et. al., these space filling curves have a specific response in the gigahertz (GHz) frequency range. This structure allows us to obtain a specific response with a single frequency of the incoming electromagnetic radiation while the other components of the electromagnetic radiation pass through this structure without any interaction (no absorption etc). The interaction of electromagnetic waves with the conducting Peano curves induces electrical currents that could be easily measured.

The Peano curves are usually comprised of wires in specific patterns. The following calculations will help describe the operational principle in more detail. The power spectrum P(ω) is related to the signal waveform s(t) as follows:

$$P(\omega) = \left| \int_{-\infty}^{\infty} s(t) e^{-i\omega t} dt \right|^2 \tag{1}$$

Assuming a 100% conversion of electromagnetic energy into electrical current at the resonance frequency, the current power in watts can be calculated from the following equation:

$$P(f_0)\Delta f \tag{2}$$

where $f_o$ is the resonant frequency and Δf is the difference in the width of the resonance curve. If R is the entire electrical resistance of the entire structure, then the amplitude of the current could be calculated from the following equation:

$$\frac{I^2}{2R} = P(f_0)\Delta f \tag{3}$$

When changing the scale of the structure (i.e. keeping the same layout of the original structure, but changing the size of the elements respectively), we are also changing the resonance frequency of the structure.

To perform a spectral analysis on an incoming waveform, the bandwidth B of the signal can be divided into separate frequency slices. The number of frequency slices N can be chosen to be:

$$N = \frac{B}{\Delta f} \tag{4}$$

When taking N layers of Peano curves, where each layer has a different iteration order or scale which matches a specific frequency, this structure can fill the signal bandwidth where each layer corresponds to a specific frequency slice.

At each specific layer, there is an interaction with the electromagnetic radiation only at the resonant frequency of that specific layer. Also, there is no interaction between other frequency components of the electromagnetic radiation and that specific layer. This type of metamaterial is completely absorbent for specific frequencies and completely transparent to others.

Figures 3A, 3B:
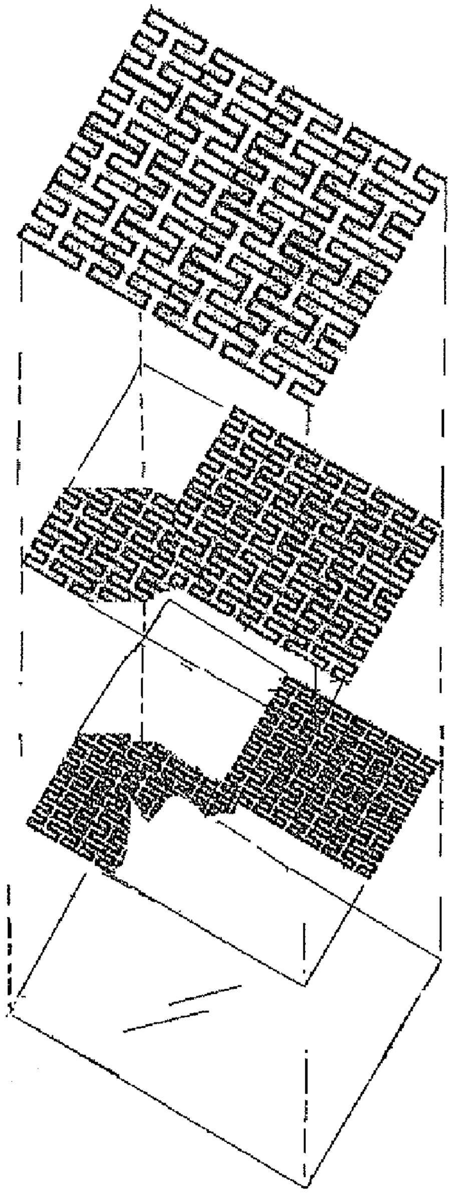

The detector can be arranged as multi-layered Peano curves, where the distance between each layer should be enough to prevent current induction between each separate layer. FIG. 3 illustrates a possible arrangement for the detector. FIG. 3 shows a detector with three layers, but it should be noted that embodiments can contain many more layers depending on the amount of slices desired and also depending on the bandwidth. Each layer has two terminals at opposite ends, each representing a different electrical pole. Each layer has a different iteration order or scale, but the total physical size of each layer is substantially the same. The layers of the detector can be stacked from highest to lowest order iteration or lowest to highest order iteration depending on the application for the detector. Each layer has resonance at the frequency of the incoming radiation.

Figure 4:
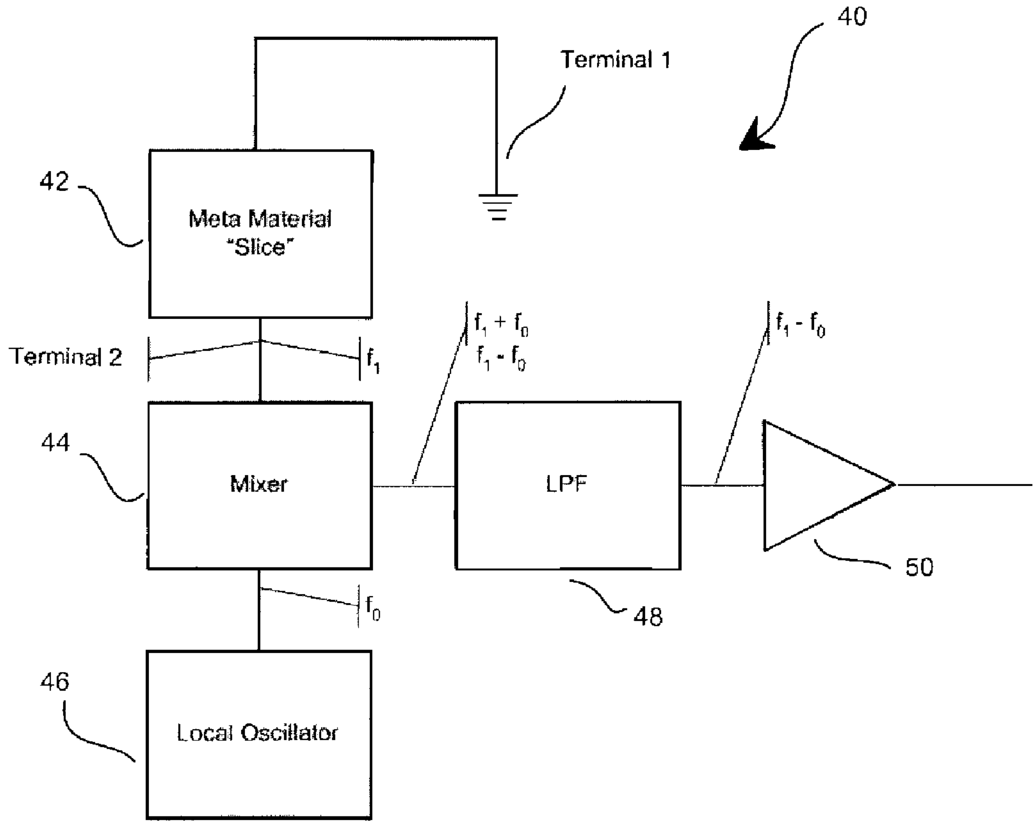
FIG. 4 is an illustration of an embodiment of an analysis circuit for each detector slice.

Each slice of the detector is connected to a circuit that enables the measurement of both signal amplitude and phase. FIG. 4 illustrates an embodiment of a circuit 40. The circuit 40 includes one of the metamaterial slices 42, a mixer 44, a local oscillator 46, a low pass filter (LPF) 48 and an amplifier 50. Each metamaterial slice 42 has two terminals, one is connected to ground and the other is connected to the mixer 44 for that slice. The metamaterial slice 42 can be a Peano curve (shown in FIG. 1), a Z-curve (shown in FIG. 2), or similar periodic arrangement.

The circuit illustrated in FIG. 4 obtains the signal (f1) from the metamaterial slice 42, and this signal is fed into the mixer 44 which has another input connected to the local oscillator 46. The local oscillator 46 is tuned to a frequency (fo) which is close to the frequency of interest (the frequency to which the metamaterial slice 42 reacts). The output of the mixer 44 is the combination of both frequencies, which is fed into the low pass filter 48.

If the difference between the frequencies is small enough (i.e. the frequencies are close to one another) then the frequency difference is the output of the LPF 48 which is then fed into the amplifier 50 for future processing. The output from the circuit includes the power spectrum of the signal and phase information about the signal. The output from a circuit is the amplitude and phase of the signal at the resonance frequency of the circuit. The output from all of the circuits covering a bandwidth B from the start frequency $f_1$ to the end frequency $f_2$ will constitute the power spectrum of the signal.

The output of the detector is the power spectrum of the incoming pulse. The sensitivity of the detector will be determined by several factors, for example:

Impedance of the metamaterial "slice";

Electrical resistance of the structure; and

Resonance width.

The detector described above can provide a solution for detection and analysis in the Terahertz range, since currently, THz detectors either require cryogenic temperatures (which increase the cost, complexity and limits possible uses for the detector) or are based on an electro-optic effect which is much less efficient. This detector is much smaller, can operate in room temperature and is therefore much less expensive and much easier to maintain and operate than present day THz detectors. These factors, coupled with the fact that it does not require the electro-optic effect, makes this detector a solution for THz detection. This detector is much smaller, can operate in room temperature and is therefore much less expensive and much easier to maintain and operate than present day THz detectors. These factors, coupled with the fact that it does not require the electro-optic effect, makes this detector a solution for THz detection.

In an analogous manner to equation 1, The electromagnetic density of the incoming signal at the detector is given by:

$$S(\omega) = \frac{1}{2Y}|E(\omega)|^2 \tag{5}$$

where Y is the free space impedance of approximately 3770. and E(ω) are the Fourier components of the incoming signal. Assuming a 100% conversion of electromagnetic energy into electrical current at the resonance frequency, the current power in watts can be calculated from the following equation, which is a modified form of equation 2 above:

$$P=AS(f_0)\Delta f \tag{6}$$

where A is the Peano curve footprint (area), $f_0$ is the resonant frequency and Δf is the width of the resonance curve. If R is the entire electrical resistance of the entire structure, then the amplitude of the current could be calculated from the following equation (which is a modified form of equation 3 above):

$$\frac{I^2}{2R} = AP(f_0)\Delta f \tag{7}$$

When changing the scale of the structure (i.e. keeping the same layout of the original structure, but changing the size of the elements respectively), we are also changing the resonance frequency of the structure.

The proposed method enables an analysis of the spectrum component of the signal without a digital FFT implementation. This ability can be helpful for high-frequency RF signals in the hundreds of MHz frequency range and up to the THz frequency range.

Metamaterial based structures such as those described above can be used in a method of wave phase discrimination to enable analysis of monochromatic waves (single frequency waveforms). By obtaining a signal and various time-delayed replicas of this same signal, phase decomposition of the signal can be derived. Metamaterial organized in multilayered grids, such as the multiple layer Peano-Gosper curves shown in FIG. 3, can be used as three-dimensional receptors for wave discrimination. FIG. 3 shows three layers, but it should be noted that embodiments can contain many more layers depending on the amount of slices desired. Each layer has a different iteration order or scale, but the total physical size of each layer is substantially the same. The multiple layers are positioned at various depths in order to absorb specific phases of the incoming signal.

Successive layers of the three-dimensional receptors are graduated to permit variable depth-of-interception of the incoming waves, allowing discrimination between concurrently received, varying wavelengths. Absorbed energy levels vary according to the depth at which the waves are intercepted by the metamaterial structure, thus exposing the wave frequency and phase shift. This is enabled by the graduated distance between layers of the three dimensional structure of the metamaterial receptor grid.

The wave phase interception delay can be calculated from the following equation:

$$\Delta\varphi = \frac{2\pi f}{c} d \tag{8}$$

where f is the frequency of the incoming wave, d is the depth of the slice from the front surface of the device and c is the speed of light. This structure can be used for signal auto-correlation analysis where the original signal and the delayed replica of the signal are needed.

In another aspect of the invention, Metamaterial based structures can be used for pulse width manipulation, i.e. to widen or shorten the width of a specific incoming or outgoing pulse from a device. This can be done as part of a detector or part of a transmitter.

Meta Materials experience a strong dispersion effect near the absorption bands. FIG. 7 describes changes in the reflection coefficient as a function of the frequency. From the figure, it can be seen that at a frequency 0.65 GHz there is a change in the magnitude of the reflection coefficient which will therefore cause a strong dispersion effect to the signal.

Pulse compression is defined as changing the width of a pulse. Metamaterials, such as Peano curves, can be used for expanding or compressing electromagnetic radiation pulses. This idea is based on the fact that metamaterials have a property of being highly dispersed, i.e. the group velocity of the wave depends on the frequency. The dispersion coefficient is defined as:

$$D_v = \frac{d}{dv}\left(\frac{1}{v}\right)$$

where v is the group velocity. The dispersion coefficient, $D_v$' is a measure of pulse time broadening per unit spectral width per unit propagation distance (s/m*Hz). If $D_v>0$, these materials are considered as normal dispersive materials. In the opposite case, where $D_v<0$, these materials are considered as anomalous dispersive materials.

In normal dispersive materials, the travel time for the higher frequency components is longer than the travel time of the lower frequency components. In anomalous dispersive materials, this behavior is opposite, the higher frequency components have a shorter travel time and the lower frequency components have a longer travel time.

Metamaterials, such as Peano curves, exhibit both normal and anomalous dispersion, depending on the frequency band. By manipulating the order of the Peano curves, we build a three dimensional structure which operates as a medium which will provide the desired dispersion coefficient. The desired dispersion coefficient is a function of the relevant frequency band, the material from which the Peano curves are comprised of, and the dimensions of the structure. In the relevant frequency band, it is desired that the dispersion coefficient will be a negative or positive constant.

The following example utilizes this proposed structure and concept for pulse compression of the signal. The incoming signal is a linear frequency modulated signal which is widely used in the field of RF (radiofrequency) communications. Frequency and phase modulated waveforms are used to achieve much wider operating bandwidth.

Linear Frequency Modulation CLFM) is commonly used in radar detection. In this case, the frequency is swept linearly across the pulse-width, either upward or downward. The signal bandwidth is proportional to the sweep bandwidth, and is independent on the pulse-width. The pulse-width is T and the bandwidth B.

The LFM up-chirp instantaneous phase can be expressed by:

$$\psi(t) = 2\pi\left(f_0 t + \frac{\mu}{2}t^2\right) \quad -\frac{T}{2} \le t \le \frac{T}{2} \tag{9}$$

where fo is the transmitter antenna center frequency, and μ=B/T is the LFM coefficient. Thus, the instantaneous frequency is $$f(t) = \frac{1}{2\pi}\frac{\partial}{\partial t}\psi(t) = f_0 + \mu t \quad -\frac{T}{2} \le t \le \frac{T}{2} \tag{10}$$

Figure 5:
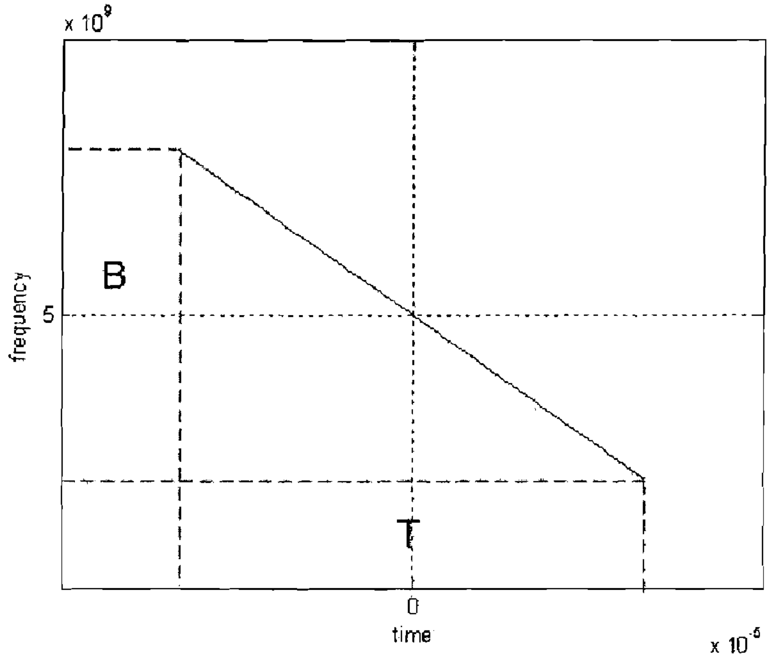
FIG. 5 illustrates a chirp-down linear frequency modulated waveform.
Figure 6:
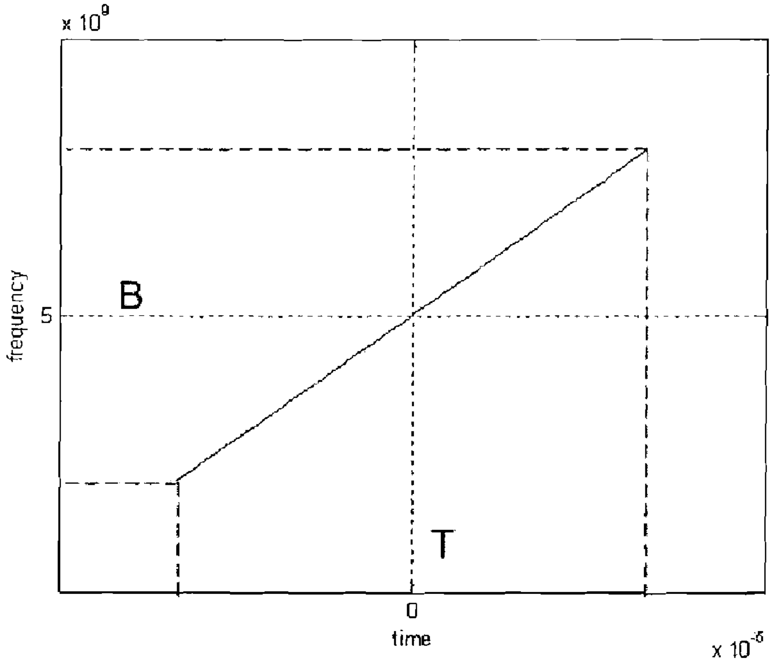
FIG. 6 illustrates a chirp-up linear frequency modulated waveform.

An example of compressing an incoming pulse is given for the chirp-down linear frequency modulated waveform illustrated in FIG. 5, and the chirp-up linear frequency modulated waveform illustrated in FIG. 6.

When a chirp-down LFM signal, illustrated in FIG. 5, enters into a normal dispersive medium, the high frequency components of the signal, which are at the "beginning" of the signal, propagate within the medium at a much slower rate than the lower frequency components. The dispersion coefficient of the material could be chosen in such a manner, that the time delay of the signal between the highest and lowest frequencies will be substantially equal to the pulse width. In such a case, all of the signal frequencies exit the metamaterial at approximately the same time and the pulse duration is very close to 0 (in the Pico-second range)—i.e. a very short pulse.

In the opposite case, where a chirp-up LFM signal, illustrated in FIG. 6, enters into an anomalous dispersive medium, the low frequency components of the signal, which are at the "beginning" of the signal, propagate within the medium at a much slower rate than the higher frequency components. The dispersion coefficient of the material can be chosen in such a manner that the time delay of the signal between the lowest and the highest frequencies is substantially equal to the pulse width. In such a case, all of the signal frequencies exit the metamaterial at approximately the same time and the pulse duration is very short pulse (similar to the above case, in the Pico-second range).

The opposite is also true, a short pulse can be expanded. When a short pulse enters into a normal dispersive medium, the low frequency components of the signal propagate at a much faster rate within the medium than the higher frequency components; which forms a signal similar to a chirp-down LFM signal (FIG. 5), and effectively widens the pulse.

When a short pulse enters into an anomalous dispersive medium, the high frequency components of the signal propagate at a much faster rate within the medium than the lower frequency components, which forms a signal similar to a chirp-up LFM signal (FIG. 6), again, effectively widening the pulse (assuming that the dispersive coefficient is constant).

An example includes an embodiment used in a system for sending and/or receiving very narrow pulses (at the pico-second range). The system could use a regular transmitter which transmits much wider pulses than desired, enabling use of a standard inexpensive transmitter. Either at the transmitter end, or at the detector, the system could utilize an embodiment of the present invention to narrow the pulse to the desired pulse width. The energy of the signal remains the same. However, the power of the signal, which is the energy divided by the width of the signal, can become much higher than that of the original signal Exemplary embodiments of the present invention have been shown by way of example in the drawings and are herein described in detail; however the present invention is susceptible to various modifications and alternative forms. It should be understood that there is no intent to limit the system to the particular forms disclosed, but on the contrary, the intention is to address all modifications, equivalents, and alternatives falling within the spirit and scope of the system as defined herein that would occur to one skilled in the art.

Exemplary embodiments of the present invention have been shown by way of example in the drawings and are herein described in detail; however the present invention is susceptible to various modifications and alternative forms. It should be understood that there is no intent to limit the system to the particular forms disclosed, but on the contrary, the intention is to address all modifications, equivalents, and alternatives falling within the spirit and scope of the system as defined herein that would occur to one skilled in the art.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A circuit for detecting electromagnetic radiation which comprises:

a) A detector comprising a continuous conductive 2-D Hilbert space filling curve having at least a first and second terminal for receiving electromagnetic radiation of a predetermined first frequency, b) a ground plane separated from the detector by a dielectric layer, the ground plane being connected to at least one terminal of said detector, c) a mixer having at least two input terminals and an output terminal, at least one input terminal connected to the other terminal of the detector not connected to said ground plane of said detector, said mixer being further in signal communication with d) a local oscillator having an output connected to the other input of said mixer, e) a low pass filter connected to the output terminal of said mixer, wherein said local oscillator operative to be tuned to a frequency ($f_o$) which is close to the first frequency of the detector, whereby the output from the circuit includes a power spectrum of signal and phase information about the electromagnetic radiation received at said detector.

2. A circuit for detecting electromagnetic radiation according to claim 1 and further comprising an amplifier connected to receive and amplify the output of said low pass filter.

3. A circuit for detecting electromagnetic radiation according to claim 1 wherein said dielectric layer is air.

4. A circuit for detecting electromagnetic radiation according to claim 1 wherein the continuous conductive 2-D Hilbert space filling curve is at least one of a Peano curve and a Z-curve.

* * * * *